United States Patent [19]

Nachfolger

[11] Patent Number: 5,367,005
[45] Date of Patent: Nov. 22, 1994

[54] HEATSET SECURITY INK

[75] Inventor: Solomon J. Nachfolger, Monsey, N.Y.

[73] Assignee: Sun Chemical Corporation, Fort Lee, N.J.

[21] Appl. No.: 241,871

[22] Filed: May 12, 1994

Related U.S. Application Data

[63] Continuation-in-part of Ser. No. 144,757, Oct. 29, 1993, abandoned.

[51] Int. Cl.5 .................... C09D 11/10; C08L 63/02; C08F 283/01
[52] U.S. Cl. ................................ 523/403; 523/414; 523/418; 524/608; 525/430
[58] Field of Search ..................... 523/403, 414, 418; 525/423, 430; 524/608

[56] References Cited

U.S. PATENT DOCUMENTS 4,166,054  8/1979  Meeske et al. ................ 260/23
4,966,628  10/1990 Amon et al. ................... 106/30
5,100,934  3/1992  Glesias .......................... 523/456

Primary Examiner—John C. Bleutge
Assistant Examiner—D. R. Wilson
Attorney, Agent, or Firm—Jack Matalon

[57] ABSTRACT

The invention relates to a heatset printing ink especially suitable for the intaglio printing of security documents, particularly currency. The ink comprises: a) an epoxy resin ester reacted with an unsaturated monobasic acid and a reactive monomer, b) a cationic polyamide/epichlorohydrin resin, c) a glycol and/or glycol ether, d) a pigment and e) a drier.

14 Claims, No Drawings

HEATSET SECURITY INK

REFERENCE TO RELATED APPLICATION

This is a continuation-in-part of copending application Ser. No. 08/144,757 filed on Oct. 29, 1993, now abandoned.

FIELD OF THE INVENTION

The invention relates to a heatset printing ink for the printing of documents by intaglio printing, i.e, engraved steel die printing. The ink has been found to be especially useful for the printing of security documents such as stamps, checks, stock certificates, bank notes, tickets, etc.; the printing ink of the present invention is particularly suited for use as a currency ink.

BACKGROUND OF THE INVENTION

The current process for printing security documents, especially currency, is sheetfed non-heatset intaglio. Sheetfed non-heatset intaglio inks are based on oxidizable resins and alkyds and are very slow drying. Typically, one side of the currency is printed first and after 24–48 hours, the other side is printed. The typical maximum printing speed of such inks is about 75 m/min. U.S. Pat. No. 4,966,628 discloses typical non-heatset sheetfed intaglio inks suitable for printing of security documents.

The term "intaglio printing" refers to a printing process wherein a printing cylinder or printing plate carries the engraved pattern and the engraved recess is filled with printing ink to be transferred to the printing substrate in order to create the document. In this type of printing, typically a rotating engraved cylinder (usually manufactured from steel, nickel or copper and plated with chromium) is supplied with ink by one or more template inking cylinders by which a pattern of inks of different color is transferred to the printing cylinder. Any excess ink on the surface of the cylinder is then wiped off by a rotating wiper cylinder covered by a plastisol, using a dilute aqueous solution of sodium hydroxide and sulfonated castor oil as an emulsifying medium for the wiped-off excess ink. Thereafter, the printing pattern is transferred, under a pressure of up to 105 kg/cm$^2$, to the substrate.

Recently, a heatset intaglio printing ink was developed at the laboratories of the assignee. Such ink is described in U.S. Pat. No. 5,100,934 assigned to the same assignee. The inks described in the '934 patent permitted security documents, especially currency, to be printed by heatset intaglio, thereby resulting in an improved product and in a printing process which permits the obverse of the printed document to be printed an instant after printing the face. However, the inks described in the '934 patent require relatively high heatset temperatures. While such high temperatures insure very rapid drying and high throughput rates, the high heatset temperatures also tend to produce undesirable yellowing and/or crinkling of the paper substrate. In contradistinction thereto, the heatset inks of the present invention require much lower heatset temperatures but yet result in a high quality product showing no evidence of yellowing or crinkling when printed at the same throughput rates as those utilized in intaglio printing with the '934 patent inks.

The principal requirements for a security document heatset intaglio printing ink are as follows:

(a) correct rheological properties in respect to transfer of the ink to the printing cylinder and transfer therefrom to the substrate;

(b) ability of the excess ink to be easily and quantitatively removed from the non-image areas of the die surface by the wiping cylinder (wipeability);

(c) ease of cleaning the wiping cylinder by means of a cleanser such as dilute aqueous caustic soda solution containing about 1% NaOH and 0.5% sulfonated castor oil or other surfactants;

(d) stability of the ink on the printing rollers; i.e. control of the evaporation of volatile materials during the printing process to prevent premature drying of the ink on the rollers;

(e) film-forming characteristics allowing handling of the webs carrying printed films of up to 200$\mu$ thickness immediately after printing;

(f) proper drying properties when printing at speeds of up to 200 m/min. with engravings of up to 200$\mu$ thickness;

(g) outstanding chemical and mechanical resistance of the printed document pursuant to specifications established by INTERPOL at the 5th International Conference on Currency and Counterfeiting in 1969 and by the U.S. Bureau of Engraving and Printing in BEP 88-214 (TN) § M5.

All of the foregoing requirements have been met by the ink compositions of the present invention. Indeed, the ink compositions of the present invention have been accepted by the Bureau of Engraving and Printing for use in printing currency by heatset intaglio printing.

DETAILS OF THE INVENTION

The heatset printing inks of the present invention comprise the following components:

a) Resin A which comprises the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10 and (ii) about 35–25 parts per hundred of a mixture of about 20–28% of one or more unsaturated monobasic acids having a polymerizable double bond and about 80–72% of one or more reactive monomers having a polymerizable double bond, said epoxy resin comprising the condensation product of bisphenol A and epichlorohydrin and having an epoxide equivalent weight of about 400–1100 and represented by the structure below wherein n has a value of 0 to about 8. Preferably, n will have an average value of about 2.2.

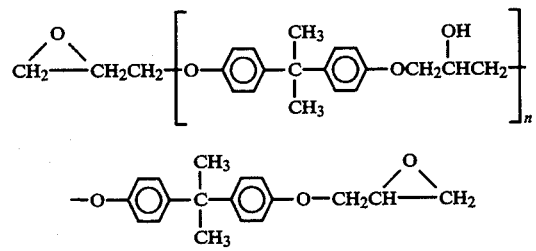

Drying oil partially conjugated unsaturated fatty acids which are especially useful for esterifying the epoxy resin are those available from safflower oil, sunflower oil, tung oil, canola oil, tall oil, dehydrated castor oil, soya bean oil, oiticica oil, plukenetia oil, perilla oil, hemp-seed oil, walnut oil, tobacco seed oil and linseed oil.

Typically the esterification of the epoxy resin with the drying oil partially conjugated unsaturated fatty acid is carried out at a temperature of about 220°–240° C. and continued until an acid number below 10 is obtained. The ester is then dissolved in a glycol ether such as ethylene glycol monobutyl ether to a concentration of 60% non-volatile and a Gardner-Holdt viscosity of K–N.

The 60% non-volatile solution of the esterified epoxy resin is thereafter reacted with a mixture of 20–28% of one or more unsaturated monobasic acids having a polymerizable double bond and 80–72% of one or more reactive monomers having a polymerizable double bond. Suitable monobasic acids include acrylic acid, methacrylic acid, crotonic acid and vinylacetic acid. Suitable reactive monomers include styrene, vinyl toluene and the acrylic and methacrylic acid esters of $C_1$–$C_{10}$ alcohols such as methyl, ethyl, propyl, isopropyl, butyl, isobutyl and 2-ethylhexyl.

Typically, 65–75 parts of the esterified epoxy resin will be reacted with 35–25 parts of the mixture of unsaturated monobasic acids and reactive monomers. The reaction between the esterified epoxy resin and such mixture may be carried over a two hour period at a temperature of about 120° to 150° C. in the presence of about 1–6 wt % of a peroxide catalyst such as di-tertiary butyl peroxide, benzoyl peroxide, cumene peroxide, tertiary butyl perbenzoate, tertiary butyl hydroperoxide, and the like. The resultant solution is then typically neutralized with an amine to a pH of about 5 to 9 to make it water dilutable.

Resins of the type of Resin A are well known and may be prepared in accordance with the teachings of U.S. Pat. No. 4,166,054 to Charles J. Meeske et al. and assigned to Reichhold Chemicals, Inc., and incorporated herein by reference. These resins are commercially available; a useful example of Resin A is Reichhold Chemicals' Epotuf® Epoxy Ester Resin 92-737 dissolved in a suitable solvent such as diethylene glycol monobutyl ether and is hereinafter referred to as "Varnish 90-164". This varnish contains 70±2% non-volatiles, has an acid number of 54–60 and a Gardner-Holdt viscosity of $Z_7$–$Z_8$. Typically, Resin A will be present in an amount of about 15 to 35 wt. %, preferably 20–25 wt. %, (calculated as 100% solids) based on the weight of the ink.

b) Resin B comprising a cationic polyamide/ epichlorohydrin resin is utilized preferably as an aqueous solution containing about 30–40 wt % resin, wherein the solvent comprises water alone or a mixture of water and up to about 35 wt. % of a diol, a glycol, a glycol ether or a mixture of a diol, glycol and glycol ether. Resin B will be present in the ink in an amount of about 0.1 to 8 wt. %, preferably 1 to 6 wt. % (calculated as 100% solids), based on the weight of the ink.

Cationic polyamide/epichlorohydrin resins referred to as "Resin B" are well known in the prior art, e.g. see U.S. Pat. No. 2,926,116. Such resin is typically prepared by reacting epichlorohydrin with a polyamide, using about 0.5–1.8 moles of epichlorohydrin per secondary amine group of the polyamide. The polyamide may be obtained by reacting a $C_3$–$C_{10}$ aliphatic dicarboxylic acid, e.g. adipic acid, with a $C_2$–$C_8$ polyalkylene polyamine, e.g. diethylenetriamine.

The reaction between epichlorohydrin and the polyamide is carried out at a temperature of about 45°–100° C. until the viscosity (corresponding to the degree of crosslinking, or molecular weight) of a 20% solids solution at 25° C. has reached about C or higher on the Gardner-Holdt scale. The reaction is then stopped and the system is stabilized by acidifying the resin solution to reduce the pH below about 6 using an acid such as hydrochloric acid. The cationic polyamide/epichlorohydrin resins contain amino, epoxy and azetidinium groups, as described on page 818 of the article by Lars Westfelt entitled "Chemistry Of Paper Wet-Strength. I. A Survey Of Mechanisms Of Wet-Strength Development", *Cellulose Chem. Technol.*, 13, 813–825 (1979).

A useful, commercially available example of a cationic polyamide/epichlorohydrin resin is Fibrabon® 3400, manufactured by Henkel Corporation. Fibrabon® 3400 is a 34 wt. % aqueous solution of cationic polyamide/ epichlorohydrin resin having a density of about 1.10 g/ml, a pH of about 3.0, a total % nitrogen value of about 4.3–7.3 (typically 5.8%) on an as-is basis and a solution viscosity of 125–250 centipoise at 25° C. (Brookfield #2 spindle @ 60 rpm).

For the purposes of the present invention, Resin B is preferably utilized as a 30–40 wt. % solution in which the solvent consists of water alone or a mixture of water and up to 35 wt. % of a diol such as butanediol-1,4, pentanediol-1,5, hexanediol-1,6, a glycol and/or glycol ether such as one of disclosed below component or mixtures of such diols, glycols and glycol ethers.

c) The third component of the ink comprises at least one glycol and/or glycol ether which is typically present in an amount of about 5 to 30 wt. %, preferably 15 to 25 wt. %, based on the weight of the ink. Suitable glycols and glycol ethers include ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

d) The fourth component of the ink is a pigment. The pigment may be any desired inorganic and/or organic pigment suitable for heatset intaglio printing and will generally be present in an amount of about 5 to 45 wt. %, preferably 10 to 40 wt. %, based on the weight of the ink. For the printing of security documents, especially currency, the preferred pigments are CI Pigment Yellow 12, CI Pigment Yellow 42, CI Pigment Black 7, CI Pigment Black 11, CI Pigment Red 9, CI Pigment Red 23, CI Pigment Red 146, CI Pigment Red 224, CI Pigment Green 7, CI Pigment Green 36, CI Pigment Blue 15:3, CI Pigment Violet 23 and CI Pigment Violet 32.

e) The fifth component of the ink is at least one drier, present in a total amount of about 0.1 to 5 wt. %, based on the weight of the ink. Suitable driers are the heavy metal salts of complex fatty acids, present singly or as mixtures. Examples of useful driers are the octoates, resinates, naphthenates, neodecanoates, tallates and linoleates and mixtures thereof of metals such as cobalt, magnesium, zinc, cerium, zirconium and mixtures thereof. If desired, a small amount, e.g. 0.1–1.0 wt. %, based on the weight of the ink, of a drier activator may be included in order to enhance the activity of the drier; a suitable drier activator is 2,2'-bipyridyl.

Preferably, the ink will contain one or more fillers in an amount of about 1 to 35 wt. %, based on the weight of the finished ink. Suitable fillers include china clay, calcium carbonate, calcium sulfate, talc, silica, corn starch, titanium dioxide, alumina and mixtures thereof. The ink may also contain about 1 to 5 wt. %, based on the weight of the finished ink, of a wax to improve scuff resistance. Suitable waxes include polytetrafluoroethylene waxes, polyethylene waxes, Fischer-Tropsch waxes, silicone fluids and mixtures thereof.

The finished inks will typically have a viscosity in the range of 2 to 30 poise at 40° C. and 100 second$^{-1}$ shear rate and may be printed at speeds of up to 200 m/min. The inks dry rapidly—typically the imprinted substrate will be cured in ovens of 5–6 meters in length at temperatures of 80° to 180° C. and a residence time of 0.1 to 2 seconds. Thus a second color may be printed almost instantaneously upon a previously-printed color; in a similar vein, the blank side of currency may be printed an instant after printing the other side. Moreover, the ink has been accepted by the Bureau of Engraving and Printing as a currency ink for heatset intaglio printing. Such acceptance is based on test procedures and requirements used to evaluate the ability of notes to withstand soiling and abuse which may be encountered during circulation. Tests of the notes include the following:

(a) chemical resistance to solvents, acids, alkalies, soaps and detergents;
(b) ink film integrity rub test;
(c) crumple test
(d) laundering test
(e) soiling test;
(f) humidity and temperature stability;
(g) flexing test;
(h) fade resistance test; and
(i) magnetic properties test;

The following examples shall serve to illustrate the invention. Unless otherwise indicated, all parts and percentages are by weight.

EXAMPLE 1

A black heatset printing ink base was prepared by combining the ingredients set forth below and thereafter grinding the mixture on a 3-roll mill until a 4/2 grind was obtained. The finished ink was then prepared by mixing the ink base and the indicated ingredients for 10–20 minutes while maintaining a temperature of <49° C.

| Ingredient | Parts |
| --- | --- |
| INK BASE | |
| Varnish 90-164 | 30.0 |
| Butyl Carbitol | 3.5 |
| CI Pigment Black 11 | 30.0 |
| CI Pigment Black 7 | 1.7 |
| Polytetrafluoroethylene Wax | 4.0 |
| Silicone Fluid | 0.5 |
| Calcium Carbonate | 10.0 |
| Total | 79.7 |
| FINISHED INK | |
| Ink Base | 79.7 |
| Varnish 90-164 | 5.5 |
| Butyl Carbitol | 5.6 |
| 5% Cobalt Neodecanoate Drier | 0.4 |
| 5% Manganese Neodecanoate Drier | 0.4 |
| 8% Zinc Octoate Drier | 0.5 |

| Ingredient | Parts |
| --- | --- |
| -continued | |
| 2,2'-Bipyridyl Drier Activator | 0.2 |
| Fibrabon ® 3400 | 7.7 |
| Total | 100.0 |

The black finished ink of Example 1 had a viscosity of 10.1 poise at 40° and a 100 second$^{-1}$ shear rate.

EXAMPLE 2

Following the procedure set forth in Example 1, a printing ink base was prepared with the ingredients listed below. In addition, a printing ink toner was prepared in the same manner using the indicated ingredients. The printing ink base and printing ink toner were thereafter combined with the indicated ingredients in the same manner as in Example 1 to form a green finished ink.

| Ingredient | Parts |
| --- | --- |
| INK BASE | |
| Varnish 90-164 | 35.0 |
| Butyl Carbitol | 8.0 |
| CI Pigment Green 7 | 2.5 |
| CI Pigment Black 7 | 0.9 |
| CI Pigment Yellow 42 | 13.0 |
| Polytetrafluoroethylene Wax | 4.0 |
| Silicone Fluid | 0.5 |
| Calcium Carbonate | 24.9 |
| Total | 88.8 |
| INK TONER | |
| Varnish 90-164 | 0.2 |
| CI Pigment Blue 15:3 | 0.1 |
| CI Pigment Violet 23 | 0.1 |
| Total | 0.4 |
| FINISHED INK | |
| Ink Base | 88.8 |
| Ink Toner | 0.4 |
| Butyl Carbitol | 1.6 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Fibrabon ® 3400 | 7.7 |
| Total | 100.0 |

The green finished ink of Example 2 had a viscosity of 6.0 poise at 40° C. and 100 second$^{-1}$ shear rate.

EXAMPLE 3

Following the procedure set forth in Example 1, a printing ink base was prepared with the ingredients listed below. The printing ink base was threafter combined with the indicated ingredients in the same manner as in Example 1 to form a black finished ink.

| Ingredient | Parts |
| --- | --- |
| INK BASE | |
| Varnish 90-164 | 30.0 |
| Butyl Carbitol | 3.5 |
| CI Pigment Black 11 | 30.0 |
| CI Pigment Black 7 | 1.7 |
| Polytetrafluoroethylene Wax | 4.0 |
| Silicone Fluid | 0.5 |
| Calcium Carbonate | 7.3 |
| Total | 77.0 |
| FINISHED INK | |
| Ink Base | 77.0 |
| Varnish 90-164 | 5.6 |
| 5% Cobalt Neodecanoate Drier | 0.8 |

| Ingredient | Parts |
|---|---|
| 5% Manganese Neodecanoate Drier | 1.4 |
| 8% Zinc Octoate Drier | 1.8 |
| 2,2'-Bipyridyl Drier Activator | 0.2 |
| Fibrabon ® 3400 | 13.2 |
| Total | 100.0 |

The black finished ink of Example 3 had a viscosity of 26.5 poise at 40° C. and 100 second$^{-1}$ shear rate.

EXAMPLE 4

The same ink base prepared in Example 3 was used to prepare the black finished ink of this example. Such ink base was combined with the indicated ingredients in the same manner to form the black finished ink.

| Ingredient | Parts |
|---|---|
| FINISHED INK | |
| Ink Base of Example 3 | 77.0 |
| Varnish 90-164 | 5.6 |
| Butyl Carbitol | 2.7 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Fibrabon ® 22* | 13.2 |
| Total | 100.0 |

*Fibrabon ® 22 contains the same resin as in Fibrabon ® 3400, but the solvent consists of a mixture of 39 wt. % water and 28.5% methyl carbitol.

The black finished ink of Example 4 had a viscosity of 7.4 poise at 40° C. and 100 second$^{-1}$ shear rate.

EXAMPLE 5

The ink base prepared in Example 3 was used to prepare the finished ink of this example. Such ink base was combined with the indicated ingredients in the same manner as in Example 1 to form a black finished ink.

| FINISHED INK | |
|---|---|
| Ingredient | Parts |
| Ink Base | 77.0 |
| Varnish 90-164 | 5.6 |
| Butyl Carbitol | 2.7 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Calcium Carbonate | 2.7 |
| Fibrabon ® 74C** | 10.5 |
| Total | 100.0 |

**Fibrabon ® 74C contains the same resin as in Fibrabon ® 3400, but the solvent consists of a mixture of 37.1 wt. % water, 20.2 wt. % butyl carbitol and 9.1 wt. % hexanediol. The black finished ink of Example 5 had a viscosity of 7.7 poise at 40° C. and 100 second$^{-1}$ shear rate.

TEST RESULTS

The finished inks of Examples 1–5 were test printed in the following manner. The green finished ink of Example 2 was utilized as the currency ink for the obverse side, i.e. the back, of U.S. currency, while each black finished ink of Examples 1, 3, 4 and 5 were tested for the face, i.e. front, of the currency.

The currency was printed by heatset intaglio at the rates indicated in Table I below, with the back side, i.e. the green side, of the currency being printed first. After printing of the green side, the web passed through a two-zone drying oven about 5 m in length; the exit temperatures of the web are also indicated in Table I. After exiting the first oven, the front of the currency was printed with the finished black ink and passed at the same web speed through a second two-zone drying oven of the same temperature and length as the first oven.

After the currency was test printed, it was given a 1 and 7 days laundering test; in such test, a failure is indicated by a score of less than 4.0, with 6.0 being a perfect score. The test-printed currency was also exposed to various chemicals for 1 and 7 days exposure periods. The chemicals employed for such test comprise 2% $H_2SO_4$, 2% NaOH, 5.25% NaOCl, 190° ethanol, perchloro-ethylene, toluene, acetone, unleaded gasoline and mineral spirits. The number of chemical rub failures (out of the 9 test solvents) is also shown in Table I. In all cases, the test printed currency achieved a maximum 6.0 score on the crumple test, and no chemical soak failures. In addition, Table I shows the ability of these formulations to withstand lower web exit temperatures while still retaining durability and resistance properties, the principal benefits of this invention.

TABLE I

| Example No. | Web Exit Temp. °C. | Web Speed m/min. | Laundering 1 day | Laundering 7 days | Chemical Rub Fail 1 day | Chemical Rub Fail 7 days |
|---|---|---|---|---|---|---|
| 1 | 132 | 120 | 5.0 | 5.7 | 4 | 3 |
| 2 | 132 | 120 | 4.7 | 5.6 | 2 | 1 |
| 1 | 132 | 105 | 3.6 | 5.2 | 5 | 3 |
| 2 | 132 | 105 | 5.2 | 5.0 | 2 | 1 |
| 1 | 132 | 90 | 5.6 | 6.0 | 4 | 4 |
| 2 | 132 | 90 | 5.2 | 6.0 | 2 | 1 |
| 1 | 121 | 130 | 3.6 | 5.5 | 5 | 4 |
| 2 | 121 | 130 | 4.9 | 5.5 | 2 | 1 |
| 1 | 104 | 135 | 4.1 | 5.0 | 5 | 3 |
| 2 | 104 | 135 | 4.2 | 5.0 | 2 | 1 |

What is claimed is:
1. A heatset intaglio printing ink comprising:
a) Resin A present in an amount of about 15 to 35 wt. %, based on the weight of the ink, Resin A comprising the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10, and (ii) about 35–25 parts per hundred of a mixture of about 20–28% of one or more unsaturated monobasic acids having a polymerizable double bond and about 80–72% of one or more reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8:

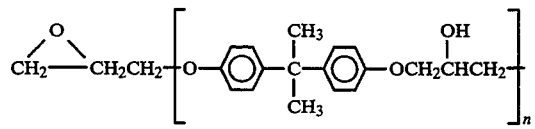

-continued

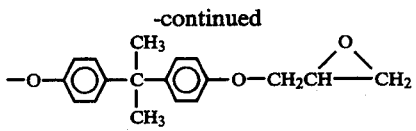

b) Resin B comprising a cationic polyamide/ epichlorohydrin resin present in an amount of about 0.1 to 8 wt. % (calculated as 100% solids), based on the weight of the ink, as an aqueous solution containing about 30–40 wt. % Resin B wherein the solvent for such aqueous solution comprises water alone or a mixture of water and up to about 35 wt. %, based on the solution, of a diol, a glycol, a glycol ether or a mixture of a diol, glycol and a glycol ether, Resin B having been prepared by reacting about 0.5–1.8 moles of epichlorohydrin per secondary amine group of the polyamide which is prepared by reacting a $C_3$–$C_{10}$ aliphatic dicarboxylic acid with a $C_2$–$C_9$ polyalkylene polyamine;

c) at least one glycol and/or glycol ether present in an amount of about 5 to 30 wt. %, based on the weight of the ink;

d) at least one inorganic and/or organic pigment present in an amount of about 5 to 45 wt %, based on the weight of the ink; and e) at least one drier, present in an amount of about 0.1 to 5 wt. %, based on the weight of the ink.

2. The ink of claim 1 wherein n has an average value of about 2.2.

3. The ink of claim 1 wherein the drying oil partially conjugated unsaturated fatty acid is obtained from an oil selected from the group consisting of safflower oil, sunflower oil, tung oil, canola oil, tall oil, dehydrated castor oil, soya bean oil, oiticica oil, plukenetia oil, perilla oil, hemp-seed oil, walnut oil, tobacco seed oil and linseed oil.

4. The ink of claim 1 wherein the unsaturated monobasic acid is selected from the group consisting of acrylic acid, methacrylic acid, crotonic acid and vinylacetic acid.

5. The ink of claim 1 wherein the reactive monomer is selected from the group consisting of styrene, vinyl toluene and the acrylic and methacrylic acid esters of $C_1$-$C_{10}$ alcohols.

6. The ink of claim 1 wherein Resin B present in the aqueous solution has a density of about 1.10 g/ml, a pH of about 3.0, a total % nitrogen value of about 4.3–7.3 and a solution viscosity of 125–250 centipoises at 25° C. (Brookfield #2 spindle @60 rpm).

7. The ink of claim 1 wherein the glycol and/or glycol ether is selected from the group consisting of ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

8. The ink of claim 1 wherein the pigment is selected from the group consisting of CI Pigment Yellow 12, CI Pigment Yellow 42, CI Pigment Black 7, CI Pigment Black 11, CI Pigment Red 9, CI Pigment Red 23, CI Pigment Red 146, CI Pigment Red 224, CI Pigment Green 7, CI Pigment Green 36, CI Pigment Blue 15:3, CI Pigment Violet 23 and CI Pigment Violet 32.

9. The ink of claim 1 wherein the drier is selected from the group consisting of the octoates, resinates, naphthenates, neodecanoates, tallates and linoleates and mixtures thereof of metals selected from the group consisting of cobalt, magnesium, zinc, cerium, zirconium and mixtures thereof.

10. The ink of claim 1 including a drier activator comprising 2,2'-bipyridyl.

11. The ink of claim 1 including a filler present in an amount of about 1 to 35 wt. %, based on the weight of the ink.

12. The ink of claim 11 wherein the filler is selected from the group consisting of china clay, calcium carbonate, calcium sulfate, talc, silica, corn starch, titanium dioxide, alumina and mixtures thereof.

13. The ink of claim 1 including a wax present in an amount of about 1 to 5 wt. %, based on the weight of the ink.

14. The ink of claim 13 wherein the wax is selected from the group consisting of polytetrafluoroethylene waxes, polyethylene waxes, Fischer-Tropsch waxes, silicone fluids and mixtures thereof.

* * * * *